United States Patent [19]

Uratani

[11] Patent Number: 4,715,871
[45] Date of Patent: Dec. 29, 1987

[54] DEHUMIDIFIER FOR A COMPRESSED GAS

[76] Inventor: Eiichi Uratani, No. 1-9 Mukojima 3-chome, Sumida-ku, Tokyo, Japan

[21] Appl. No.: 40,752

[22] Filed: Apr. 20, 1987

Related U.S. Application Data

[63] Continuation of Ser. No. 910,260, Sep. 19, 1986, abandoned, which is a continuation of Ser. No. 719,212, Apr. 2, 1985, abandoned.

[30] Foreign Application Priority Data

Jul. 26, 1984 [JP] Japan .................. 59-156403

[51] Int. Cl.⁴ .............................................. B01D 46/12
[52] U.S. Cl. .......................................... 55/222; 55/259; 55/269; 261/153
[58] Field of Search .......................... 55/222, 269, 259; 261/153

[56] References Cited

U.S. PATENT DOCUMENTS

| | | | |
|---|---|---|---|
| 2,076,119 | 4/1937 | Carraway | 261/153 |
| 2,209,661 | 7/1940 | Pickstone | 55/269 |
| 2,509,031 | 5/1950 | Bockmeyer | 261/140 R |
| 2,805,559 | 9/1957 | Hamilton | 261/153 |
| 2,859,946 | 11/1958 | Boyle et al. | 261/140 R |
| 3,050,954 | 8/1962 | Royse | 55/269 |
| 3,148,516 | 9/1964 | Kals | 261/140 R |
| 3,290,025 | 12/1966 | Engalitcheff, Jr. | 261/140 R |
| 3,591,947 | 7/1971 | Sexton | 55/259 |
| 3,760,566 | 9/1973 | Zievers et al. | 55/259 |
| 3,923,480 | 12/1975 | Visch | 55/269 |
| 4,316,726 | 2/1982 | Hopper | 55/259 |
| 4,443,389 | 4/1984 | Dodds | 261/153 |

Primary Examiner—Tim Miles
Attorney, Agent, or Firm—Sandler & Greenblum

[57] ABSTRACT

A dehumidifier for compressed gas is disclosed which comprises a heat exchanger pipe, a sprinkler over the heat exchanger pipe, a sump for receiving sprinkled water, a water-supplying pipe for recycling the water from the sump to the sprinkler, an air-intake arranged at a level between the heat exchanger pipe and the sump, a forced exhaust system including a rotating fan, and a gas-liquid separator for removing moisture, oil and other floating matters from the compressed gas.

5 Claims, 1 Drawing Figure

DEHUMIDIFIER FOR A COMPRESSED GAS

This application is a continuation of application Ser. No. 910,260, filed Sept. 19, 1986, which is in turn a continuation of Ser. No. 719,212 filed Apr. 2, 1985, both now abandoned.

FIELD OF THE INVENTION

This invention relates to a dehumidifier for a compressed gas, in which the compressed gas of a high or normal temperature may be cooled efficiently by water to a lower level than a dry-bulb temperature, thereby to remove its humidity without need for a power from, for example, a compressor.

BACKGROUND OF THE INVENTION

In order to cool a compressed gas of a high or normal temperature to a lower level than a dry-bulb temperature to remove humidity of the gas for preventing water drops from being condensed in a feeding pipe, a refrigerator has been used.

However, the refrigerator requires a high plant cost and a high power consumption due to necessity of cooling operation by means of a compressor. Further, the refrigerator may often suffer from accidents, such as leakage of a coolant from a heat exchanger pipe, and must be inspected and replaced periodically. Thus, the maintenance and inspection must be carried out very often, resulting in a high maintenance cost.

Accordingly, an object of the invention is to provide a dehumidifier of a compact type, which may efficiently cool a compressed gas of a high or normal temperature by water to a lower level than a dry bulb temperature and thus remove humidity of the gas, without need for a power from a compressor, thereby to save the maintenance cost considerably.

SUMMARY OF THE INVENTION

In order to achieve the above object, the invention provides a dehumidifier for a compressed gas, which comprises a heat exchanger pipe, a sprinkler for sprinkling water over said heat exchanger pipe, a sump arranged under said heat exchanger pipe for receiving the sprinkled water, a water-supplying pipe for recycling the water from the sump to the sprinkler, an air-intake arranged between the heat exchanger pipe and the sump, a forced exhaust system for exhausting the air around the heat exchanger pipe from the air-intake, and a gas-liquid separator for removing moisture, oil and other floating matters contained in the compressed gas which has passed through the inside of the heat exchanger pipe.

The invention will be described hereinbelow in more detail for better understanding with reference to the accommmpanying drawings.

BRIEF DESCRIPTION OF THE DRAWING

FIGURE is a sectional view of dehumidifier according to the invention.

PREFERRED EMBODIMENTS OF THE INVENTION

Figure 1:
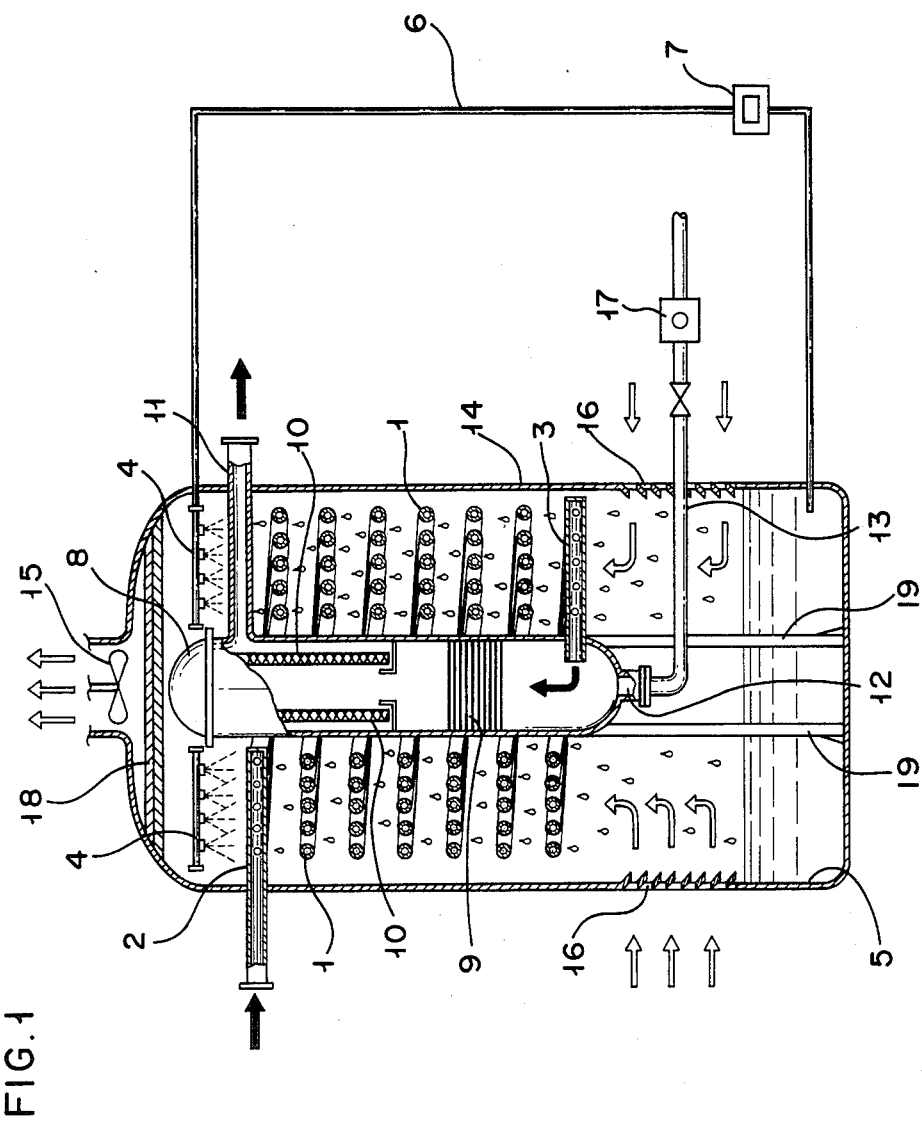

In the drawing, the reference numeral 1 represents a heat exchanger pipe made of a highly heat-conductive material. The heat exchanger pipe 1 is fabricated in a substantially cylindrical form by coiling material tubes spirally in a quintuple configuration with the outer coiled tube of larger diameter surrounding sequentially the inner coiled tube smaller diameter, as shown in FIGURE. The heat exchanger pipe 1 of the spirally coiled cylinder is arranged vertically, each upper opening of which is communicated with an inlet header 2 for feeding a compressed gas, while each lower opening is communicated with an outlet header 3.

On the other hand, a sprinkler 4 is arranged above the heat exchanger pipe 1 while a sump 5 is arranged under the latter. Water is fed by a pump 7 from the sump 5 to the sprinkler 4 through a water-supplying pipe 6. The water thus sprinkled by the sprinker 4 is received in the sump 5 and recycled through the same route as described hereinabove.

At a center of the spiral heat exchange pipe 1 is arranged a gas-liquid separator 8 which at its lower portion is communicated with the outlet header 3 and thereabove provided sequentially a demister 9 and a liquid-removing element 10. The separator 8 at its upper portion is communicated with a tube 11 for feeding a gas to outside.

The compressed gas fed from the heat exchanger pipe 1 through the outlet header 3 into the gas-liquid separator 8 is freed from moisture, oil and other floating matters during passage through the demister 9 and the liquid-removing element 10. The gas thus treated is fed outside through the feeding tube 11, while the water, oil and floating matters thus removed are discharged outside through a drainage opening 12 at a bottom of the separator 8 and through a discharge tube 13.

As shown in the drawing, the heat exchanger pipe 1, the sprinker 4, the sump 5, the gas-liquid separator 8 and others are accommodated in a cylindrical body 14 of the dehumidifier. In an upper center of the dehumidifier body 14 is arranged a forced exhaust system comprising a rotating fan 15 for forcibly evacuating the air from the dehumidifier. Further, the dehumidifier body 14 is provided with an air-intake 16 at a level between the heat exchanger pipe 1 and the sump 5.

In the drawing, the reference 17 represents an automatic drainage device for automatically draining the moisture, oil and floating matters collected in the bottom of the separator 8. The reference 18 represents an eliminator arranged at the upper portion of the dehumidifier for preventing dusts from being discharged outside, and the reference 19 represents legs for supporting the gas-liquid separator 8.

In operation, water is sprinkled from the sprinkler 4 over the heat exchanger pipe 1 under rotation of the fan 15, while the compressed gas is fed through the inlet header 2 into the heat exchanger pipe 1, thereby to cool the compressed gas in the heat exchanger pipe 1 by latent heat of vaporization of the sprinkled water.

The water having deprived heat from the compressed gas is cooled with air introduced by the evacuating fan 15 through the air-intake 16 into the dehumidifier. The cooled water is received in the sump 5 and recycled by the pump 7 through the pipe 6 to the sprinkler 4. The air from the air-intake 16 may cool the water having deprived heat from the compressed gas and may be contacted with the sprinkled water as a water layer for depriving heat around the heat exchanger pipe 1, which is then evaporated. Thus, the higher removal of the latent heat of vaporization results in the improved cooling efficiency.

The compressed gas thus cooled is fed from the outlet header 3 into the gas-liquid separator 8, which gas has been cooled in the heat exchanger pipe 1 to have a reduced amount of saturated steam. Consequently, the moisture, oil and floating matters in the compressed gas are susceptible to condensation and may be removed readily during passage through the demister 9 and the liquid-removing element 10 within the sparator 8. These impurities thus removed are discharged outside through the drainage opening 12, the discharge tube 13 and the automatic drainage device 17. On the other hand, the compressed gas free of these impurities is fed through the supplying pipe 11. If the compressed gas has been cooled below a dry bulb temperature of the atmosphere on this occasion, these impurities do not condense in the supplying pipe 11, thereby to achieve a very good feeding condition.

When the compressed gas at 46 degrees C. was practically fed from the inlet header 2 under the condition of a dry bulb temperature at 32.5 degrees C. and a wet bulb temperature at 25 degrees C. for the cooling dehumidification, it was cooled to 27 degrees C. at the outlet pipe 11. Since the dry bulb temperature was 32.5 degrees C., the impurities did not condense at all.

In the drawing, a solid arrow shows the flow of the compressed gas, while a blank arrow shows the air flow.

It will be appreciated that the gas-liquid separator 8 may be located in any place within the dehumidifier or even outside, in stead of its arrangement in the center of the spirally coiled heat exchanger pipe 1 as shown in the drawing.

In accordance with the invention, significantly efficient cooling dehumidification may be achieved without need for a compressor or the like, resulting in a low equipment and maintenance cost, as well as a low electric consumption.

The dehumidifier according to the invention comprising the heat exchanger pipe 1 for effecting the heat exchange between the compressed gas and the surrounding material, the sprinker 4 for sprinkling water over the heat exchanger pipe 1, the sump 5 arranged under the heat exchanger pipe 1 for receiving the sprinkled water and the water-supplying pipe 6 for feeding water from the sump 5 to the sprinkler 4 allows the compressed gas to be cooled by the latent vaporization heat of the sprinkled water. The water, which has deprived heat from the compressed gas, may be received in the sump 5 and recycled through the water-supplying pipe 6 to the sprinkler 4.

Further, the dehumidifier according to the invention, including the air-intake 16 at a level between the heat exchanger pipe 1 and the sump 5 as well as the forced exhaust system for exhausting air introduced from the air-intake 16 and flowed around the heat exchanger pipe 1, allows the heat-deprived water to be cooled by the air from the air-intake 16 during its falling down to the sump 5. Thus, constantly cooled water may be recycled to the sprinkler 4. Further, since the water is sprinkled over the heat exchanger pipe 1, any scales deposited on the outer surface of the heat exchanger pipe 1 may be readily observed visually, leading to a very convenient maintenance.

The air from the air-intake 16 may cool the heat-deprived water and come into contact with the sprinkled water, which has formed the water layer around the heat exchanger pipe 1, thereby to evaporate the same. Thus, the more amount of the latent vaporization heat may be deprived from the compressed gas in the heat exchanger pipe 1, resulting in a significantly improved cooling efficiency.

The gas-liquid separator 8 may readily remove impurities, such as the moisture, oil and other floating matters contained in the compressed gas, because the compressed gas has been cooled in the heat exchanger pipe 1 to reduce its saturated steam amount and to make the impurities susceptible to condensation. Thus, if the compressed gas has been cooled below the dry bulb temperature, it neither decrease its temperature therebelow nor reduce its saturated steam upon being fed outside, resulting in a very good feeding condition without condensation of the impurities.

As described hereinabove, the dehumidifier according to the invention may be constructed in a very simple and compact form and does not require a compressor and a large area for equipment, resulting in a low equipment cost and a low power cost. Further, very high efficiencies for cooling the compressed gas and for removing the impurities contained therein may be achieved without the aid of other powers, such as the compressor, so that the compressed gas may be fed in the very good condition without condensation of the impurities within the feeding pipe. In addition, the scales if any deposited from the cooling water may be readily observed visually, resulting in the very convenient maintenance and inspection.

Although the invention has been described hereinabove with the preferred embodiments, many variations and modifications may be possible without departing from the scope of the invention.

What is claimed is:

1. A dehumidifier for a compressed gas, said dehumidifier comprising:
   (a) a coiled heat exchanger pipe, said pipe having a plurality of substantially parallel spiral windings, said coiled pipe being substantially horizontal and comprising a plurality of uppermost coils and a plurality of lowermost coils;
   (b) a sprinkler positioned above the uppermost coils of said pipe, said sprinkler comprising means for sprinkling water over said heat exchanger pipe;
   (c) a sump positioned below the lowermost coils of said pipe, said sump comprising means for receiving said sprinkled water;
   (d) a water supply pipe for conducting said sprinkled water from said sump to said sprinkler;
   (e) a housing, wherein said coiled pipe, said sprinkler and said sump are all positioned within said housing, and wherein said water supply pipe is positioned substantially exteriorly of said housing;
   (f) a plurality of air-intake openings positioned along a wall of said housing, said air-intake openings being positioned below the lowermost coils of said pipe and above said sump;
   (g) a forced air exhaust system comprising means for forcing air within said housing upwardly past said coiled pipe, said forced air exhaust system including a rotating fan positioned in an upper portion of said housing;
   (h) a gas-liquid separator comprising means for removing moisture, oil and other floating material from compressed gas being conducted through the interior of said coiled pipe, said separator being located within the pipe winding having the smallest diameter;
   (i) a compressed gas inlet tube for introducing gas from the exterior of said housing to said coiled pipe, the inlet tube being positioned along an upper portion of said housing; and (j) an outlet pipe connected to an upper portion of said gas-liquid separator for conducting compressed gas from said separator to the exterior of said housing, wherein said gas-liquid separator includes a demister and at least one liquid removing element, wherein said demister is located within said separator and above an outlet header through which cooled gas enters said separator, said liquid removing element being positioned above said demister within said separator.

2. A dehumidifier in accordance with claim 1 wherein said water supply pipe has a pump attached thereto.

3. A dehumidifier in accordance with claim 1 wherein a drain opening is located in the bottom of said gas-liquid separator, a discharge tube being attached to said drain opening.

4. A dehumidifier in accordance with claim 1, further comprising means for cooling said compressed gas to prevent impurities from condensing within said outlet pipe.

5. A dehumidifier in accordance with claim 1, wherein said outlet header is connected to said lowermost coils.

* * * * *